May 1, 1934.  H. A. FOOTHORAP  1,956,569
ADDING AND LISTING MACHINE
Original Filed March 25, 1927  12 Sheets-Sheet 5

Inventor
Harry A. Foothorap.

Witness:
F. C. Gibson.

Attorney

Patented May 1, 1934

1,956,569

UNITED STATES PATENT OFFICE 1,956,569

ADDING AND LISTING MACHINE

Harry A. Foothorap, Harrisburg, Pa., assignor to Elliott-Fisher Company, New York, N. Y., a corporation of Delaware Original application March 25, 1927, Serial No. 178,348. Divided and this application March 29, 1930, Serial No. 440,142

29 Claims. (Cl. 101—93)

My invention relates to improvements in recording mechanism for adding and listing machines.

Generally speaking the object of my invention is to equip a machine of the ten key adding and listing type for recording in a flat horizontal plane either in correspondence with values set up in the machine or in complemental correspondence with such values.

Other objects more or less subordinate to the above are also comprehended by my invention as will presently appear when the nature of the invention develops from the following description and claims.

The present application is a division of my co-pending application Serial No. 178,348 filed March 25, 1927, to which attention is invited in connection with the present disclosure.

In the illustrated embodiment of my invention, by way of exemplification only, the recording mechanism of my invention is shown as part of the equipment of a machine constructed, as regards the adding mechanism, along the general lines of the Dalton adding and listing machine of commerce disclosed, for example in U. S. Letters Patent to Landsiedel, 1,430,088, September 26, 1922 and Grogel, et. al. 1,475,944, December 4, 1923.

Figure 2:
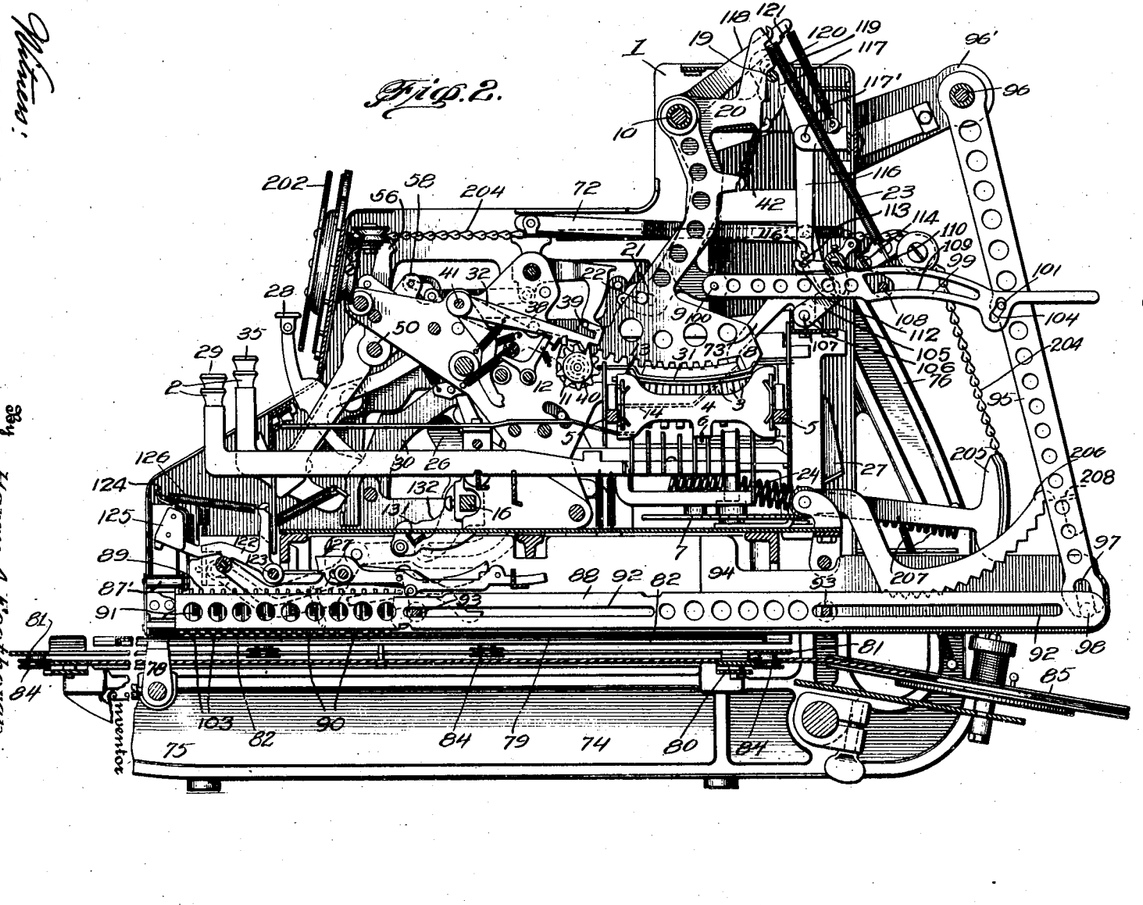
Figure 2 is a longitudinal sectional view, on a smaller scale, taken on the line 2—2 of Figure 1.

With reference to said adding mechanism, 1 (Fig. 2) designates the usual casing of the "Dalton" machine, and 2 the value keys thereof. The value keys 2, as regards values 1 to 8, set pins 3, arranged in a field to have value positions therein corresponding to the values of said keys. The field of pins 3 is mounted in a pin carriage 4 movable denominationally upon tracks 5 by a motor spring 6 and controlled by a key operated escapement indicated generally at 7. Denominational movement of the carriage 4 positions the set pins 3 in the path of lugs 8 on differential toothed actuators 9 which latter are oscillated on a rock shaft 10 to drive the number wheels 11, of the usual register 12, in degree corresponding to the values of the set up pins. In setting up the value 9 a stop plate, indicated at 13, on the carriage 4 intercepts the lugs 8 on the differential actuators 9 as will be understood. Denominational movement of the carriage 4 also releases the differential actuators 9, for subsequent operation, by moving from in front of the lugs 8 a stop plate 14. The plate 14 may be depressed to an actuator releasing position for a purpose presently apparent.

Figure 1:
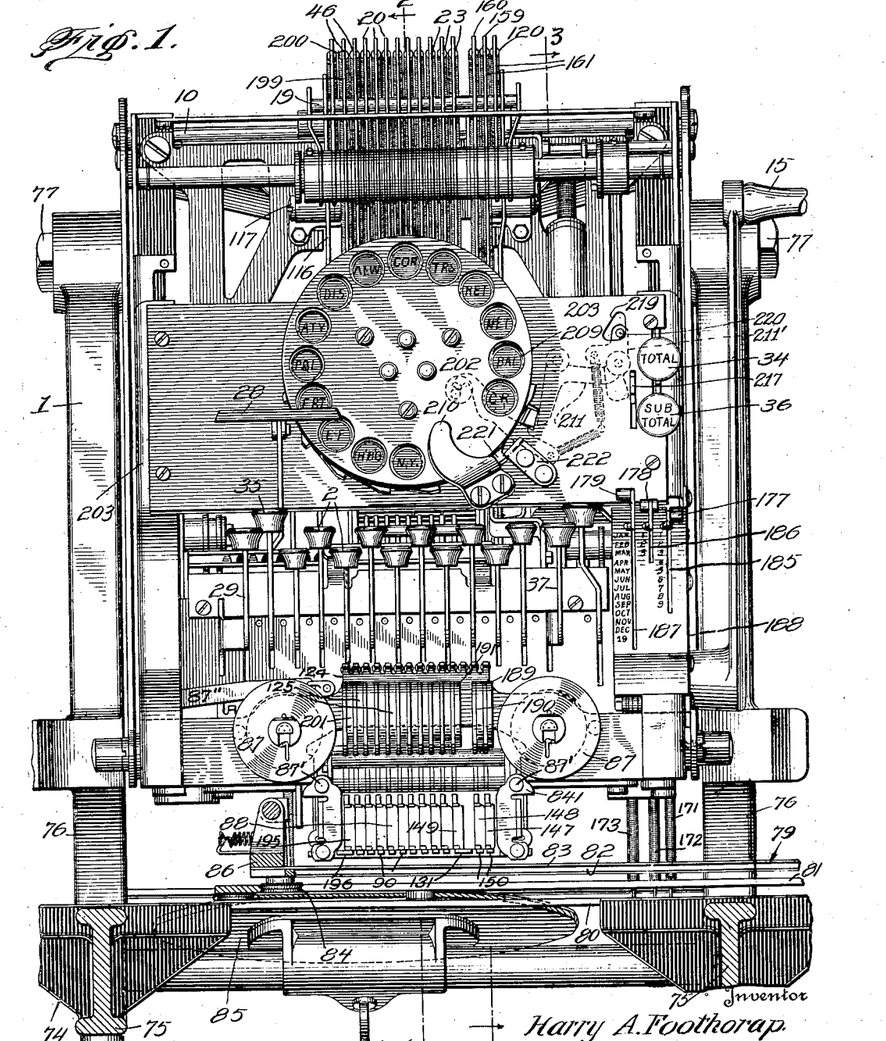
Figure 1 is a front elevation of a machine embodying my invention.
Figure 3:
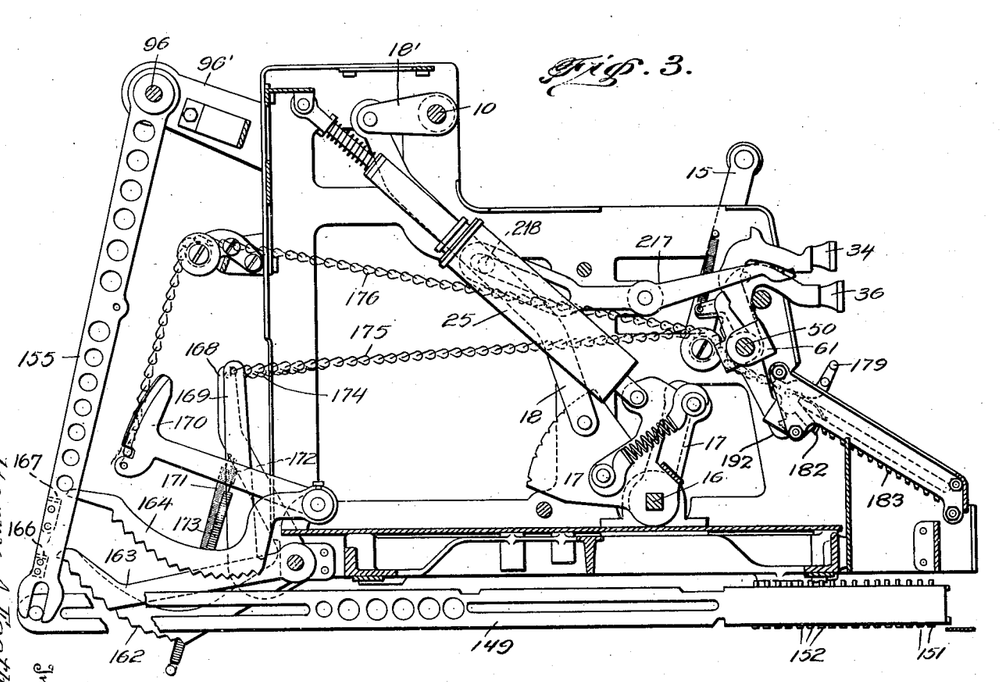
Figure 3 is a similar view taken on the irregular line 3—3 of Fig. 1 and looking toward the opposite side of the machine.

To accumulate the values in the register 12 the operating crank 15, (Fig. 1) fast on operating shaft 16, (Figs. 2 and 3) is moved forwardly. This operation through connections 17, 17' and 18 rocks said shaft 10 to lower an actuator releasing and returning bail 19, fast on said shaft 10, from behind a series of actuator driving arms 20 mounted to oscillate on said shaft 10 and connected by slot and pin connections as at 21 and 22 respectively, to the differential actuators 9.

As the bail 19 is lowered the driving arms 20 are swung by motor springs 23 in a direction to swing the differential actuators 9 forwardly against the set up pins 3 or the nines stop plate 13, as the case may be. The operating crank 15 is returned by the springs 24 against the usual dash-pot 25 to reposition the driving arms 20 and differential actuators 9. During return of the operating crank 15 and shaft 16 the carriage 4 is automatically returned by means of carriage return mechanism indicated generally at 26 and 27, also operative by a carriage return key 28, and disabled by a multiply key 29 and mechanism indicated at 30 and for a purpose well understood. Return movement of the carriage 4 engages the set pins 3 with a resetting plate 31 which operation returns them to normal position.

The operation of the register 12 in the "Dalton" type machine is also so well known that it need merely be noted in passing. It is sufficient to say that the register 12 is adjusted vertically on pivoted arms, as at 32, (Fig. 6) by a part of the actuating mechanism, indicated at 33, to mesh the register number wheels 11 with the actuators 9, or to disengage them therefrom, in timed relation to forward and return strokes of the actuators 9, according to the character of computation being performed. Under normal adding conditions the number wheels 11 are engaged with the actuators 9 during the return stroke of the latter and the accumulating operation then takes place. The mechanism 33 is under control of the special keys, i. e. the "total", "non add", "sub total" and "subtract" keys designated 34, 35, 36 and 37, (Fig. 1) respectively, for a purpose which will presently appear.

The numeral 38 (Fig. 2) designates one of the usual hooked transfer dogs of this adding mechanism, which normally engage, against pins as at 39, on the actuators 9, and prevent their rearward movement. Transfer cams, one of which is shown at 40, raise the transfer dogs 38, at the proper time, on their pivots 41 so that the hooked ends thereof release the pins 39 and are positioned to receive the same within the slot of the hook. Said cams 40 also limit reverse movement of the number wheels to zero registering position as will be understood. When the dogs 38 are raised, suitably connected springs 42 are free to move the actuators 9 rearwardly, and effect the transferring operation.

By virtue of the slot and pin connections 21 and 22 the operating crank 15 and driving arms 20 have an initial degree of idle forward movement before they pick up the actuators 9 which have not assumed transferring positions. This, as will be understood, is to allow for first disengaging the number wheels 11 from said actuators 9 and for returning to starting position those actuators which have transferred.

Subtraction is performed in this adding mechanism by complemental addition and automatically adding the "fugitive 1". To this end an additional transfer dog 38 and pin 39 are associated with the units number wheel actuator 9. This transfer dog is raised by the bell crank lever 43 shown in Figure 6, through the medium of a pivoted arm 44 mounted on the shaft 10 and a depressible finger 45 mounted on said arm. The arm 44 is similar to the driving arms 20, and is swung forwardly by a motor spring 44' under control of the operating mechanism in the same manner as said arms 20, with the exception presently noted. The finger 45 is depressed into operative position relative to the bell crank lever 43 through the medium of a segmental stop lever 46, and a pin 47 thereon, as will be presently explained. The segmental stop lever 46, is set into different positions by depression of the "total", "non add", "sub-total", and "subtract" keys, respectively, and is provided with a series of stepped notches 48 which, in their different set positions, are engaged by a stop 49 on the arm 44 and thus limit forward movement of said arm in different degree. In its normal position the segmental stop lever 46 limits forward movement of the arm 44 at the end of the initial degree of idle forward movement of the operating crank 15 and actuators 9.

As regards the setting of the segmental stop lever 47 the "total" key 34 (Figs. 3 and 6) rocks the shaft 50 and crank 51 to move the pitman 52 and sliding link 53 and set the segmental stop lever 46 in one position against the urge of the spring 53'. The bar 55 (Fig. 7) shown in the drawings and the crank arm 56, which is fast on the shaft 50, are part of a total and sub-total key locking mechanism which is unlocked by a blank stroke of the operating crank 15 and operated by the "total" and "sub-total" keys. Such a stroke is required prior to taking a total or sub-total to reset the transfer dogs 38 and actuators 9 which have assumed transferring positions. A secondary function of the bar 55 is to depress the plate 14, by means of the arm 57, so that in taking a total the actuators 9 will be free to spring forward during the forward stroke of the operating crank 15 and rotate the number wheels 11 to zero or clear position, all as described in my co-pending application supra. In taking a total it will be understood that mechanism 33 is actuated to effect disengagement of the number wheels 11 from the actuators 9 during their return stroke so that the register remains cleared.

The "non add" key 35 (Fig. 2) through connections indicated at 58, and fully disclosed in my before-mentioned co-pending application, rocks a shaft 59 (Fig. 6) and crank 60 to move the pitman 52 and sliding link 53 and set the segmental stop lever 46 in a second position. In non-add operations the mechanism 33 effects disengagement of the number wheels 11 from the actuators 9 during both strokes of the latter and no accumulation takes place.

The "sub-total" key 36 (Fig. 3) moves about the shaft 50 to pick up the "total key" 34, and effect the operation of the actuators 9, described with reference to said "total key" 34, it being understood that in this case the mechanism 33 effects engagement of the number wheels 11 with the actuators 10 during both strokes of the latter and the number is retained in the register. As an incident to picking up the "total key" 34 the "sub-total key" 36, also picks up a sleeve 61, (Fig. 6) on the shaft 50 to swing a crank arm 62, fast on the sleeve 61, and connected as at 63 to the pitman 52 and sliding link 53 to set the segmental stop lever 46 in a third position.

Figure 6:
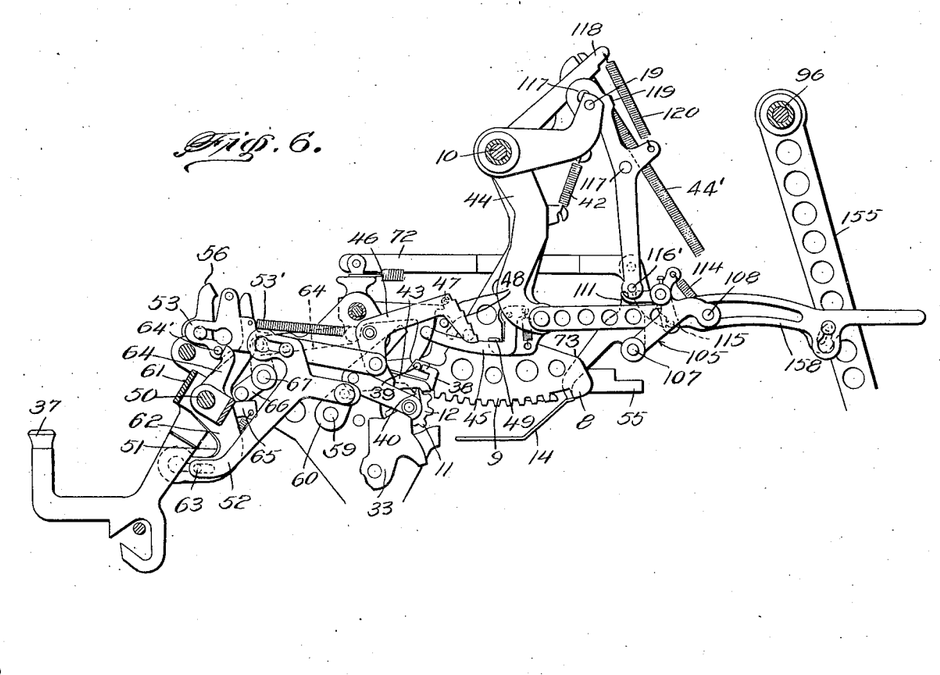
Figure 6 is a similar view, looking at the opposite side of the machine, illustrating devices controlled by the special control keys of the machine, together with parts of an auxiliary special character and date recording unit included in my recording mechanism, and subtraction setting mechanism.
Figure 7:
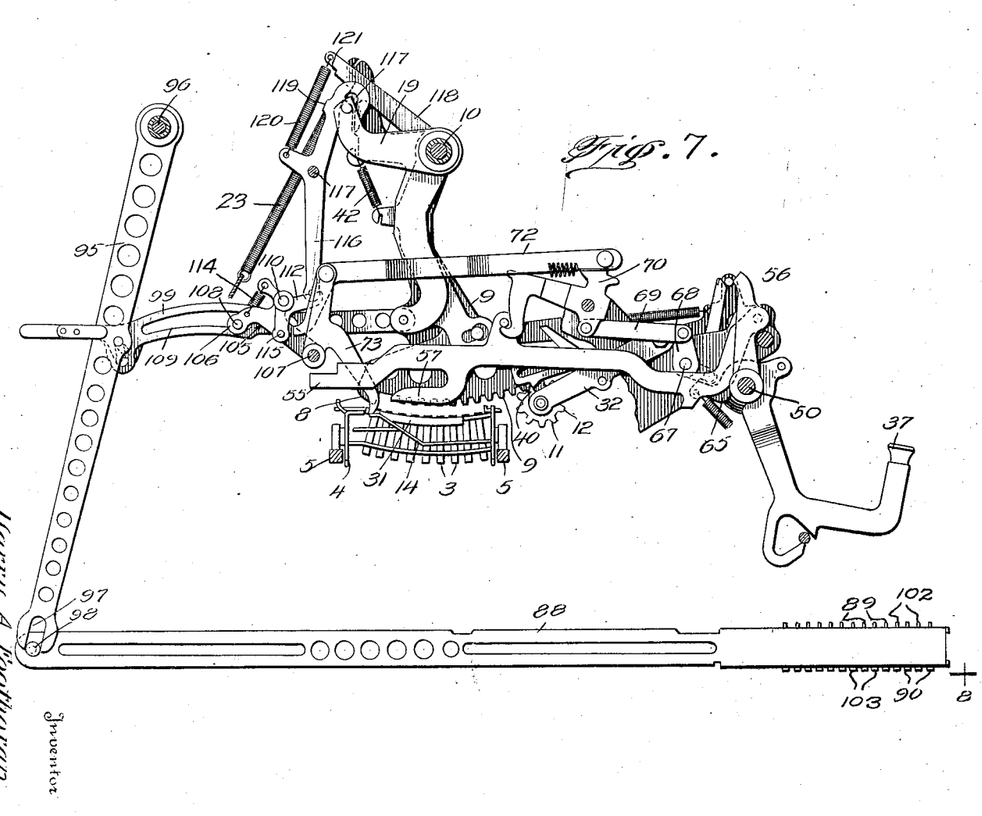
Figure 7 is a similar view, looking at the opposite side of the machine and illustrating operations following depression of the subtract key.

The "subtract" key 37 moves the sliding link 53, to set the segmental stop lever 46 to a fourth position by means of a crank arm 64 which engages a pin 64' on said link 53 as will be clear from an inspection of Figures 6 and 7. In this fourth, or subtract position, the pin 47 on the segmental stop lever 46 depresses the finger 45 into operative position relative to the bell crank lever 43 for the purpose of effecting addition of the "fugitive 1". It should be mentioned that at the same time the "subtract" key, through arm 65, rocks crank 66, fast on one end of shaft 67. The other end of the shaft 67 has a crank 68 fast thereon which through link 69 rocks a segment 70 in one direction against the urge of a spring 71. The segment 70 is connected by a pull rod 72 to a rock arm 73 arranged to depress the stop plate 14 and release all the actuators 9. This is for the purpose of effecting the setting up of 9's, in the register, 12 to the left of the subtrahend number as will be understood. The segment 70, in another of its functions, cooperates with the previously referred to locking bar 55 for a purpose which is not important in connection with the present invention.

The before described adding mechanism is mounted at the rear of a base 74, (Figs. 1 and 2) the latter including a pair of forwardly extending frame bars 75 having vertical brackets 76 at their rear ends between which the casing 1 is suspended, above said bars 75, as by trunnions 77.

Said base also supports a flat bar like platen 78 suitably mounted between the bars 75 and beneath the front of the adding mechanism, and a work carrier designated generally by the numeral 79.

The work carrier 79 is described in detail and claimed in my co-pending application Serial No. 440,141, filed March 29, 1930. Generally speaking it includes a series of superposed horizontal frames 80, 81 and 82, the top one of which is covered by a work supporting diaphragm 83, said frames being arranged one upon the other, by rollers 84, so that the top one is movable in both line and column space directions against the urge of a reaction motor 85. The structure designated 86 is a combined work clamp and gauge bar mounted on the top frame.

A ribbon mechanism, including ribbon spools 87, guides 87', and feed mechanism 87'' is shown in the drawings, but no claim is made herein to this feature.

According to my present invention a series of horizontal type carriers 88, one for each number wheel 11 are mounted between the adding mechanism and the platen 78, side by side, to dispose them in a denominational order corresponding to that of the number wheels 11 and actuators 9. (See Figures 1 and 2).

Mounted in the front ends of the type carriers 88 (see Fig. 10) are a series of ten vertically disposed type bars 89 equi-distantly spaced and provided at their lower ends with type 90, from 0 to 9, arranged in numerical order beginning at the front of said carriers. The type bars 89 normally project above the upper edges of the type carriers 88 for a purpose presently apparent and are held in such position by retractile springs as at 91, the type acting against the lower edges of the carriers 88 as stops. The type carriers 88 are mounted for reciprocation back and forth to move them to and from recording position over the platen 78. For this purpose said carriers are preferably slotted at suitable intervals, as at 92 to receive and slide upon squared cross bars 93 extending between depending hanger plates 94 secured to the bottom of the casing 1.

A series of vertical type carrier levers 95, (Fig. 2) one for each type carrier, are mounted to swing back and forth upon a cross rod 96 secured in brackets 96' projecting from the rear of the casing 1 above the type carriers 88. The lower ends of the type carrier levers 95 are operatively connected with the rear ends of the type carriers 88 by a compensating slot 97 receiving a roller 98 on the carrier.

The carrier levers 88 are connected to the driving arms 20 of actuators 9 of corresponding denominational order by individual horizontal links 99 whereby the type carriers 88 are moved to and from recording position by said driving arms but under control of said actuators. The links 99 are pivotally connected at one end to the lower ends of the driving arms 20 by pins 100 and have their opposite ends similarly connected to the type carrier levers by pins 101.

As will be seen, the type carriers 88 are movable by the driving arms 20 through an operating cycle, first, forwardly through the aforesaid idle degree of movement of said arms 20, then in degree predetermined by the selection set up in the machine and then backwardly to starting position.

Figure 5:
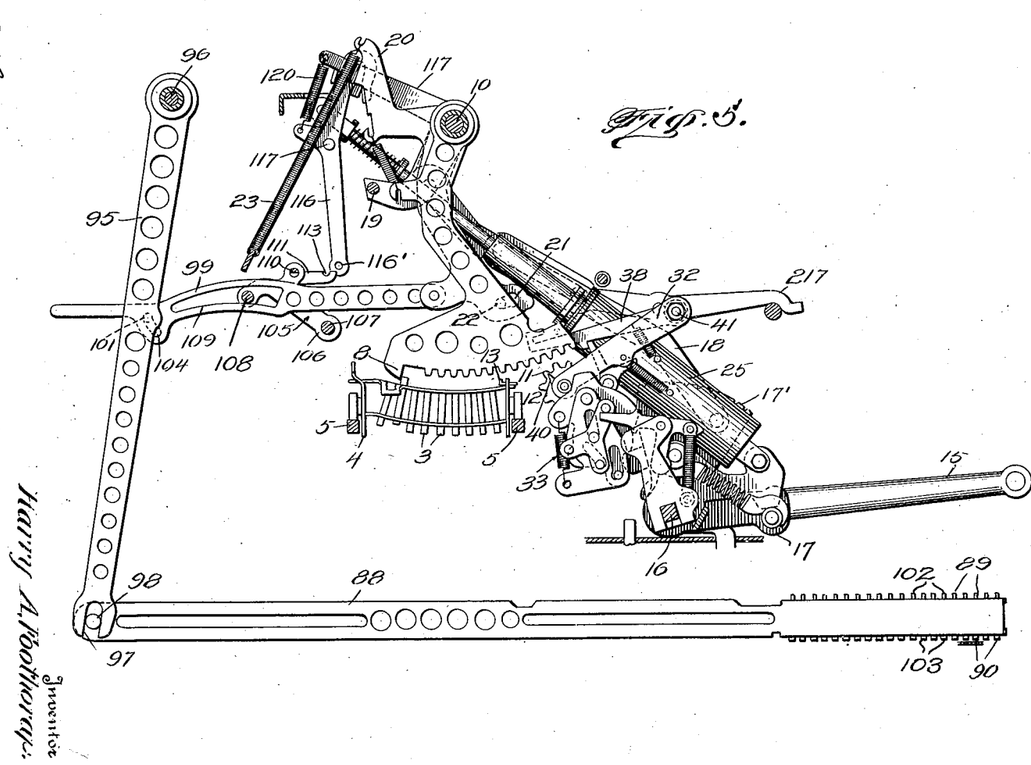
Figure 5 is a similar view, looking in the opposite direction, and illustrating the position of the recording mechanism at the end of a full forward stroke of the operating crank in a straight adding operation.

At this point it is to be noted that the idle degree of forward movement of the driving arms 20 brings them into operative engagement with the actuators 9, while the latter are in a zero selecting position. The spacing of the type bars 89 and the arrangement of the link connections 99 between the driving arms 20 and type carrier levers 95 is such that during straight adding, or blank stroke operations, the zeroes of the type 90 will be moved to recording position during this idle degree of forward movement of the arms 20. Thereafter further forward movement of said arms 20 will move type 90 to recording positions corresponding in value to the number of increments of forward movement of the actuators 9. This is clearly illustrated in Figures 5 and 10 wherein the 1 type has been moved to recording position in accordance with a selection of 1 set up in the calculating mechanism.

Figure 11:
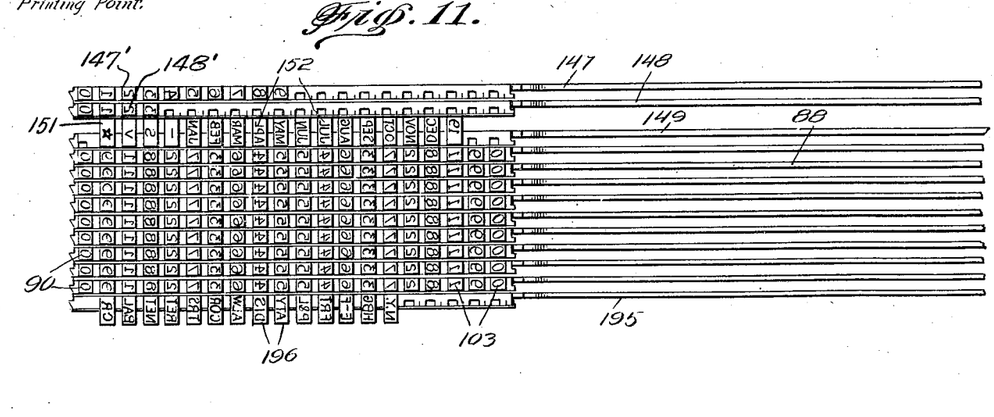
Figure 11 is a bottom plan view of the type and type carriers.

A second series of vertical type bars 102 provided with type 103 at their lower ends are mounted upon each type carrier 88 for recording during subtracting operations. The type bars 102 and their type 103 alternate with the bars 89 and type 90, and said type 103 are disposed in reverse numerical order beginning with 9 adjacent the front of the carriers 88 and ending with 0, as shown in Figure 11.

The type bars 102 are mounted upon their carriers and relatively spaced as described with reference to type bars 89. Preferably the type 103 are italics to distinguish them from type 90. As will be understood, the series of type 103 are normally idle and must be operatively positioned for movement to and from recording position.

To operatively position the type 103 there is provided subtraction setting or state control mechanism for selectively moving the type carriers 88 forwardly independently of control by the actuators 9. To this end, the horizontal links 99 (Fig. 1) are provided with cam slots 104 receiving the pivot pins 101 of the type carrier levers 95 and adapted upon an upward adjustment of said links, to cam said type bar levers 95 forward an appropriate distance. The horizontal links 99 are adjusted upwardly by means of a vertically movable yoke 105 comprising a pair of arms 106 suitably pivoted at one end as at 107, below said links 99 and connected by a cross rod 108 extending through elongated cam slots 109 (Fig. 5) in said links. The yoke arms 106 carry a horizontal rock shaft 110 having fast upon its opposite ends a pair of substantially horizontal coupling levers 111, 112, each provided with a notch 113. The coupling levers 111 and 112 are normally held in an inactive position, against the urge of a suitably disposed contractile spring 114 (Fig. 6) and by the before-mentioned pull rod 72, one end of which normally bears against a crank pin 115 on the coupling lever 112.

In the normal position of the yoke 105 (Fig. 2) the cross rod 108 bears against the lower edges of the cam slots 109 in the links 99, in which position it is held by the reaction of the spring 114, to urge the links 99 toward normal position. The lower edges of the cam slots 109 act to maintain the yoke 105 and coupling levers 111, 112, stationary during movement of said links 99 in straight adding operations. Above the coupling levers 111 and 112, a pair of vertical rocker arms 116 are pivoted as at 117', intermediate their ends, and so that their lower ends are movable back and forth over said coupling levers. The upper ends of the rocker arms 116 are provided with cam slots 117 receiving the bail 19 previously described. The cam slots 117 are formed so that upon movement of the operating crank 15 forwardly, the lower ends of the rocker arms 116 are moved forwardly a short distance, by said bail 19. In this position they are latched by a pair of latch arms 118 pivoted at one end upon the cross shaft 10 with their opposite ends overlying the bail 19 and projecting over lateral lugs 119 upon the rocker arms 116. The latch arms 118 are normally held raised from the lugs 119 by the bail 19 against the tension of springs 120 connected to the rocker arms 116 to urge them in a return direction. At the proper time the latch arms 118 descend and position stop shoulders 121 thereon relative to the lugs 119 to block return of the rocker arms.

When the subtract key 37 operates the pull rod 72, as previously described, the coupling levers 111, 112, are moved by the spring 114 to engage their notches 113 with suitably disposed pins 116' upon the lower ends of the rocker arms 116 (see Fig. 7) whereby the yoke 105 is coupled to said arms for movement upwardly during initial forward movement of the operating crank 15. An upward adjustment is consequently imparted to the horizontal links 99, the type carriers 88 moved forwardly and independently and the type 103 adjusted into the starting position of the type 89. This coupled condition of the yoke 105 and rocker arms 116 will be maintained as long as the subtract key 37 is held in operative position and the type 103 will be operated through the same cycle of movement as type 89. In the Dalton machine the subtract key is usually latched in operative position until the return of the operating crank 15. Upon release of the subtract key 37 the cross rod 108 under the urge of the spring 114 cams the links 99 back into normal position to restore the type carriers 88 to their former positions. When the crank 15 is returned the latch arms 118 are raised from latching position and the rocker arms 116 are returned by joint action of the bail 19 and the springs 120. It will, of course, be understood that the operative initial positioning of the type 103 takes place during the idle forward movement of the driving arms 20, and immediately moves all the nines to printing position. Thereafter type 103 will be moved to the printing point corresponding in complemental value to the number of increments of movement of the driving arms 20 and actuators 9. Since the value is complemental, it will be that of the actual number subtracted.

For a more detailed disclosure of the foregoing reference may be had to my aforesaid copending application Serial No. 178,348.

Figure 9:
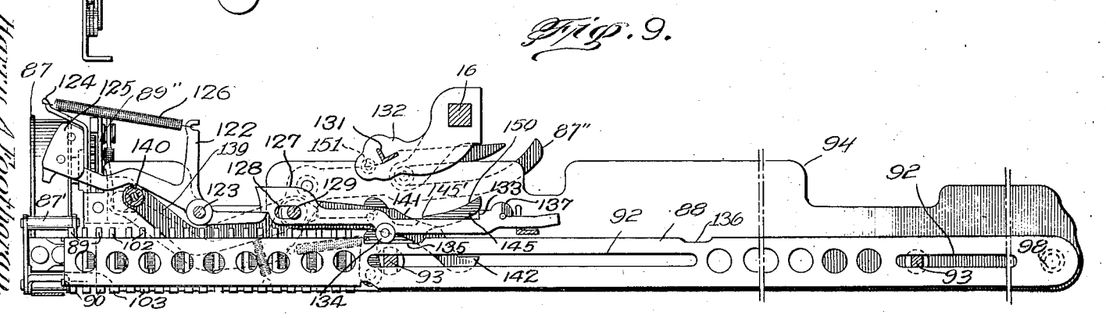
Figure 9 is a longitudinal section taken on the line 9—9 of Figure 8.

A series of vertically moving type hammer levers 122, (Figs. 2, 9 and 10) one for each type carrier 88, are pivoted intermediate their ends, parallel with the type carriers, and above the same upon a cross rod 123 extending between the front ends of the hanger plates 94. The front ends of the type hammer levers 122 project over the printing point of the platen 78 through a guiding comb plate 124 extending between the sides of the casing 1 and are provided with type hammers 125 which descend upon the type bars 89 and 102 to impress their type against the work. The type hammers 125 descend under the action of individual springs 126 having their ends suitably connected to their levers 122 and to the comb plate 124, respectively. The hammers 125 are held in elevated position by individual type hammer latches 127 extending parallel with the hammer levers 122, above the same. Said hammer latches 127 are slotted as at 128 near their forward ends to receive a cross rod 129, extending between the hanger plates 94, so that they have both a pivotal and a limited endwise movement on said rod.

In their normal position the forward ends of the hammer latches 127 (Fig. 9) overlie the rear ends of associated hammer levers 122 (see Figs. 9 and 14) with their rear ends projecting under the operating shaft 16. From this position they are movable endwise to a releasing position against the tension of individual springs 130. The hammer latches 127 are moved to releasing position by a cross bar 131 extending between a pair of crank arms 132 fast upon the operating shaft 16, and whereby the bar 131 is rotated into engagement with lugs 133 on said hammer latches to pick up the latter as the operating crank 15 nears the end of its forward stroke. The hammers 125 are normally retained in elevated position and are released selectively under the control of their associated type carrier 88 as follows.

Figure 12:
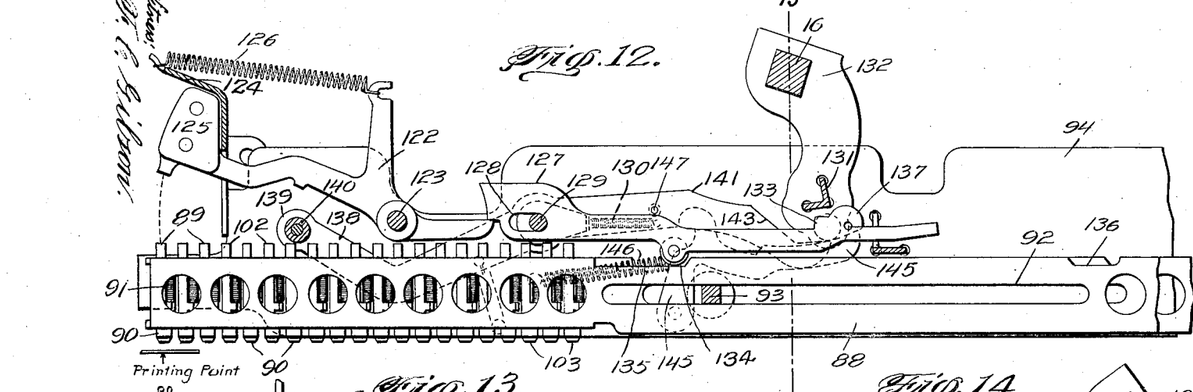
Figure 12 is a view similar to Fig. 10, illustrating the position of the parts during initial forward movement of the operating crank.
Figure 13:
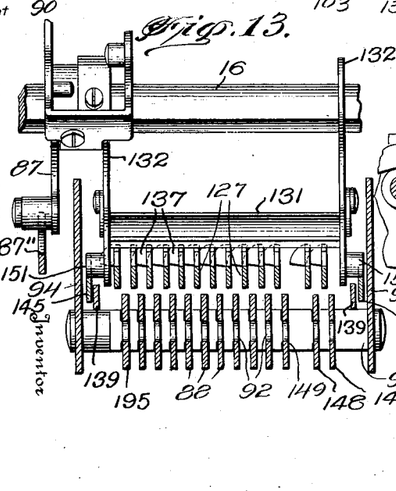
Figure 13 is a transverse section taken on the line 13—13 of Fig. 12.

In the rear of their pivot points the hammer latches 127 are provided with rollers 134 which ride upon the top edges of the type carriers 88. In the starting position of the latter the rollers 134 seat in depressions 135 in said edges of the type carriers 88 and the lugs 133 of said hammer latches are outside the path of movement of the cross rod 131. (See Figs. 9 and 12). The depressions 135 correspond in length to the distance the zero type 90 moves from starting to recording position. Upon forward movement of the type carriers 88, past this point, the rollers 134 ride up onto the edges of the type carriers 88, thus moving the lugs 133 into the path of movement of the cross rod 131, before the ones type 90 reaches recording position.

At a suitable point the type carriers 88 are provided with a second similar depression 136 in which the rollers 134 seat when the zero type 103 have been moved to recording position in complemental addition. Thus the type carriers 88 lock out the hammers 125 when all said carriers are moved to either of their zero recording positions and no recording takes place during an idle stroke of the operating crank 15 even though the subtract key 37 is depressed. The type carriers 88, it will be seen, control individually the release of their associated type hammers 125 when moved to value recording positions. Each type carrier 88 also controls, with the exception of the units carrier hammer 125, release of all hammers of lower order type carriers as follows. The hammer latches 127, with the exception of that of the units type carrier 88, are each provided with a lateral projecting lug 137 overlying the hammer latch of the next higher order type carrier. When the latter is moved to a value recording position, its hammer latch 127 picks up the hammer latch below it, this operation is repeated by successive hammer latches down to the hammer latch of the units type carrier, and they are all moved into position to be released by operation of the crank 15. It follows that in both straight and complemental addition zeros will be recorded to the right of values 1 to 9.

Figure 10:
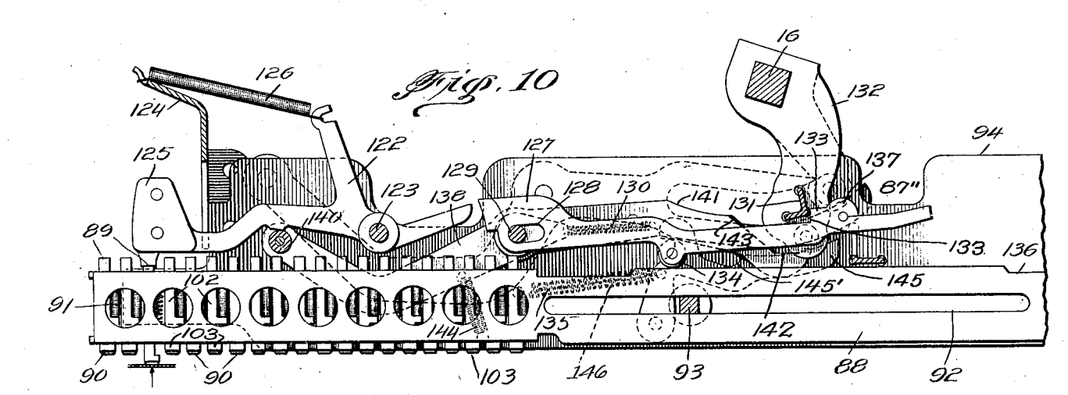
Figure 10 is an enlarged fragmentary view illustrating operation of said type hammers and releasing and resetting mechanism.
Figure 14:
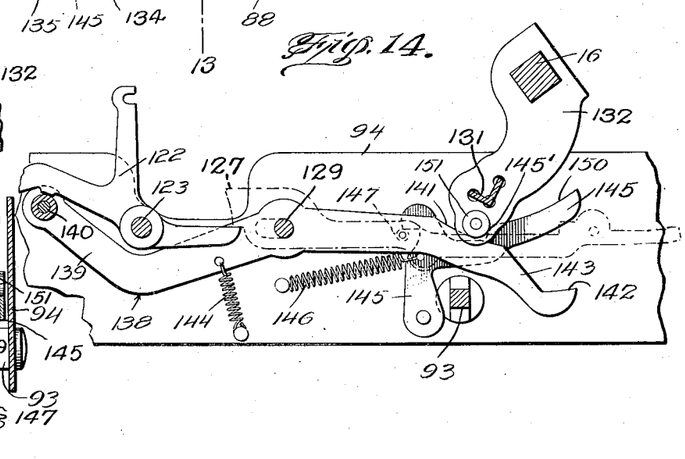
Figure 14 is a fragmentary view illustrating operation of the hammer releasing and resetting mechanism.

The hammers 125 are returned by a hammer resetting bail 138 including a pair of laterally spaced horizontal levers 139 connected at one end by a bail rod 140. The bail levers 139 are pivoted intermediate their ends, upon the cross rod 129, with the bail rod 140 extending beneath the forward ends of the hammer levers 122 and their rear ends beneath the operating shaft 16. The rear ends of the bail levers 139, as best shown in Figs. 10 and 14, are formed with two concave cam portions 141 and 142, respectively, one below the other and connected by oblique cam portion 143. The cam portions 141 and 142 are curved so that in the resetting position of the bail 138 they are concentric with the operating shaft 16. The forward ends of the bail levers 139 are urged downwardly by suitably disposed contractile springs 144 but are held elevated by pivotal bail latches 145 urged by springs 146 to hook over suitably disposed pins 147 on said bail levers 139. The bail latches 145 are provided with tail pieces, disposed beneath the operating shaft 16 and formed respectively with a shoulder 145′ and a concave cam portion 150.

The bail latches 145 are disengaged from the pins 147, the bail 138 permitted to lower under the urge of the springs 144, and the hammer latches 127 are moved to releasing position, in the order named as the operating crank 15 nears the end of its forward stroke. At the appropriate point in this cycle of movement the crank arms 132 engage their rollers 151 (Fig. 14) with the shoulders 145′ of the bail latches 145 and disengage them from the pins 147. In the meantime said rollers 151 ride upon the curved cams 141 of the bail levers 139, holding the bail 138 stationary and the hammers 125 elevated.

When the bail latches 145 are fully disengaged said rollers 151 engage the oblique cam portions 143 and the springs 144 are permitted to lower the bail rod 140 until said rollers 151 engage the lower cam portions 142. During their engagement with the oblique cam portions 143 the rollers 151 ride upon the concave cam portions 150 of the bail latches 145, said portions being so shaped that said bail latches are held stationary. When the bail rod 140 has been completely lowered the cross rod 131 moves the hammer latches 127 to release the hammers 125 (Fig. 10). Upon return of the operating crank 15 the rollers 151 contact the oblique cam portions 143 to first operate the bail 138 to return the hammers 125 and then release the bail latches 145 to be returned by their springs 146. The hammer latches 127 are released by the cross bar 131 and are returned by their springs 130 to latching position. By having the type hammers and hammer latches released during the forward manual movement of the crank 15 and operating mechanism, the springs 24 which return said crank and mechanism to accumulate values in the register, are relieved of this extra load during the accumulating operation. Incidentally since there is less load opposing forward movement of the operating crank, as will be apparent, the slight extra load thus imposed imparts balance to the operating crank and operating mechanism.

Associated with the foregoing main recording mechanism are auxiliary recording units which will now be described.

Figure 8:
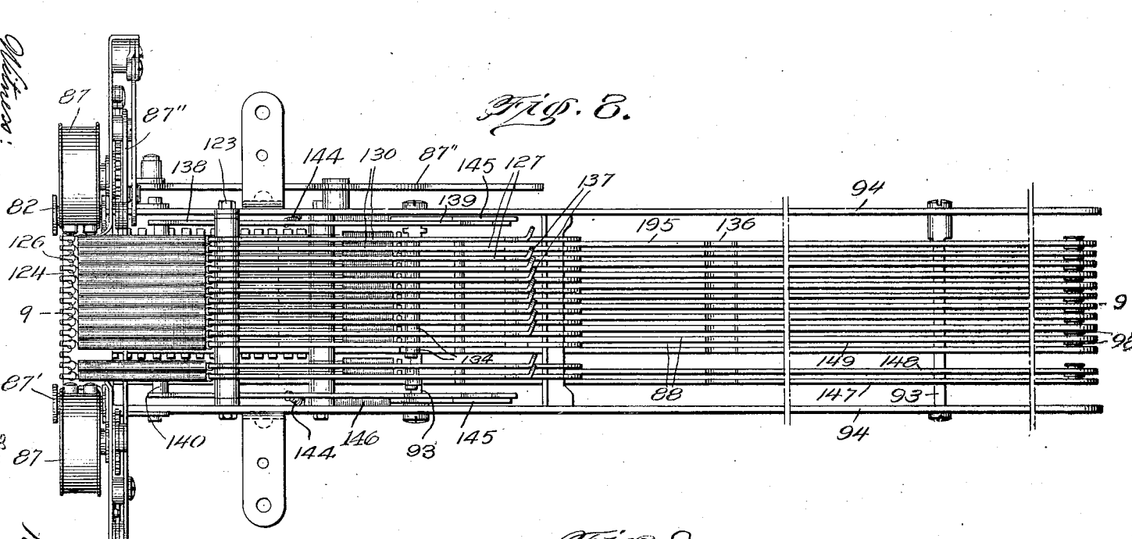
Figure 8 is a top plan view, partly broken out, of the type carriers of my recording mechanism together with associated type hammers and hammers releasing and resetting mechanism.

At one side of the type carriers 88, a series of three type carriers, 147, 148 and 149 respectively, are mounted side by side upon the cross rods 93 (see Figures 8 and 11). These type carriers form part of a combined date and special character printing unit. They are, except as presently noted, constructed and mounted as described with reference to type carriers 88 and occupy the same starting position as said carriers 88. Two of the type carriers, 147 and 148, carry number type 147′ and 148′ arranged in numerical order beginning at the front of these carriers. The third type carrier 149 carries the usual special character type 151, for designating total, non-add, sub-total, and subtract operations, followed by abbreviating type 152 for designating the months and the year. The type of the carriers 147, 148 and 149 are mounted thereon as described with reference to type 90 and 103.

Figure 4:
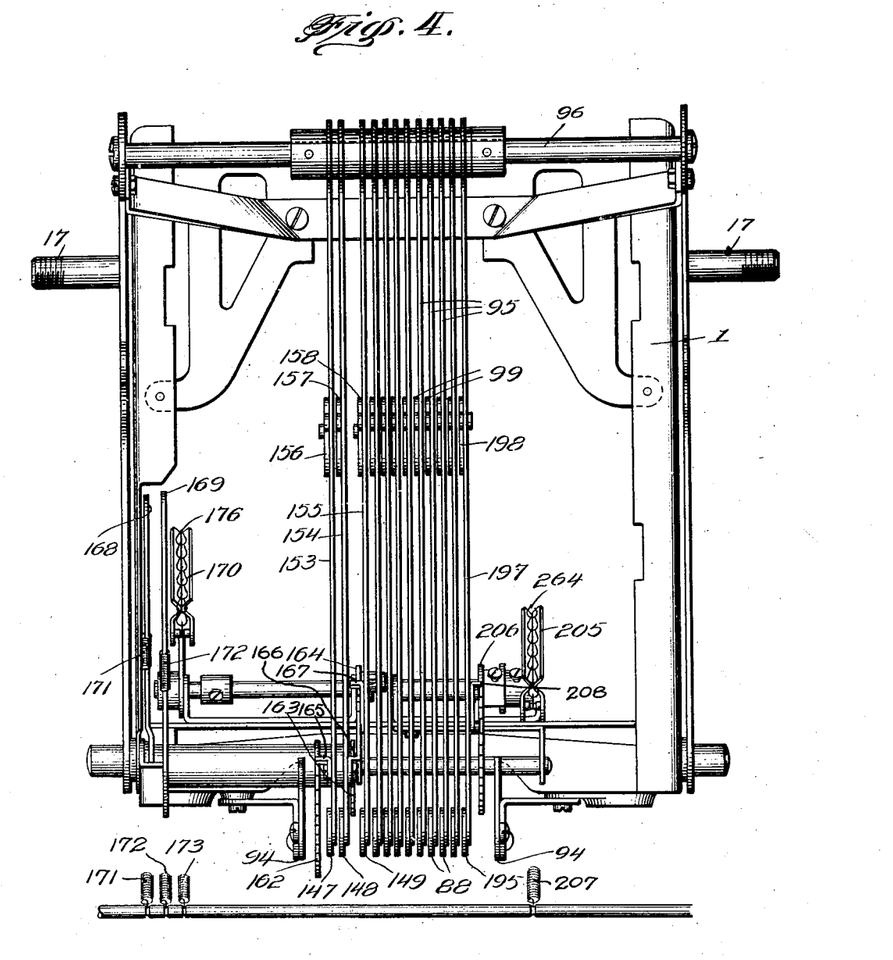
Figure 4 is a detail view in rear elevation.

Operatively connected to the type carriers 147, 148 and 149 are individual type carrier levers 153, 154 and 155, (Figs. 3, 4 and 15) respectively, having the same characteristics described with reference to the type carrier levers 95. Individual links 156, 157 and 158, respectively, corresponding to links 99, are pivotally connected at one end to the type carrier levers 147, 148 and 149. The other ends of the links 156 and 157 are connected to arms 159 and 160 (Fig. 1) corresponding to driving arms 20. The other end of the link 158 is connected to the previously described arm 44 (see Figs. 6 and 15). Each of the arms 159 and 160 are operated by the bail rod 19 and springs 161 as described with reference to driving arm 20 and arm 44. For convenience in assembling the links 156, 157 and 158 are constructed and disposed, like the links 99, to receive the cross rod 108 of the yoke 105, but are connected to their type carrier levers 153, 154 and 155 so that their consequent adjustment by said yoke 105 does not affect their type carriers 147, 148 and 149.

Figure 19:
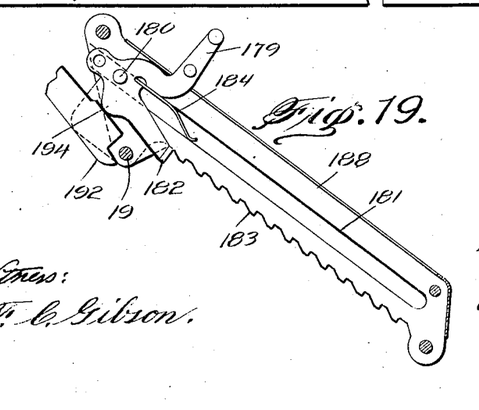
Figure 19 is a detail view of a key mounting for one of said auxiliary control units.

The selection of type 147′, 148′ and 152 (Fig. 11) is controlled, as regards date recording, independently of the keys of the calculating mechanism. For this purpose individual stepped segments 162, 163, and 164 (Figs. 3, 4 and 15) for each type carrier lever 153, 154 and 155 are pivotally mounted upon the rear of the casing 1, for movement in the path of stop lugs 165, 166 and 167 carried by said levers. The stepped segments 162, 163, and 164, it will be understood, are adapted to be set to different positions to limit forward movement of corresponding type carriers as successive type are moved to recording position. Said stepped segments have operatively connected thereto individual setting levers 168, 169 and 170 respectively, by means of which they are set to different positions against the action of suitably disposed springs 171, 172 and 173 respectively. The setting levers 168, 169 and 170 are connected by pull chains 174, 175 and 176 to setting keys 177, 178 and 179 located at one end of the keyboard of the calculating mechanism. Said setting keys are mounted by pivot pins, one of which is shown at 180 (see Figure 19), for sliding movement in guideways 181, and whereby they may be rocked on said pins and set to different positions. Each setting key 177, 178 and 179 is provided with an integral holding dog 182 projecting beneath a rack 183. Suitably disposed springs, as at 184, normally urge said setting keys about their pivot pins 180 to engage the holding dogs 182 with the teeth of their racks 183 to normally prevent return of said setting keys from their set position. By rocking said setting keys against their springs 184 they may be released for return movement as will be clear.

The proper position of the setting keys 177, 178 and 179 are indicated by scales 185, 186 and 187 (Fig. 1) marked off on a slotted cover plate 188, through which said setting keys project, in correspondence with the type 150 and 154. After the type 150 and 154 have been moved to recording position, they are operated by hammers 189, 190 and 191 respectively, mounted and operated as described with reference to hammers 125.

As regards special character printing, selection of the type 151, as will be clear, is normally under the control of the special control keys 34, 35, 36 and 37 of the adding mechanism. It will of course, be understood that these types are arranged on their type carrier 149 so that they are moved to recording position in correspondence with the character of the special control key depressed, and that no type 151 moves to the printing point, unless a special control key, is depressed to move the segmental stop lever 46 from its normal position. Since in its normal and different set positions the segmental stop lever 46 obstructs forward movement of the type carrier 149 and the month abbreviation type 152 follow the special character type 151, it follows that operation of the special character and date printing unit for date printing purposes is blocked under normal operating conditions.

Figure 15:
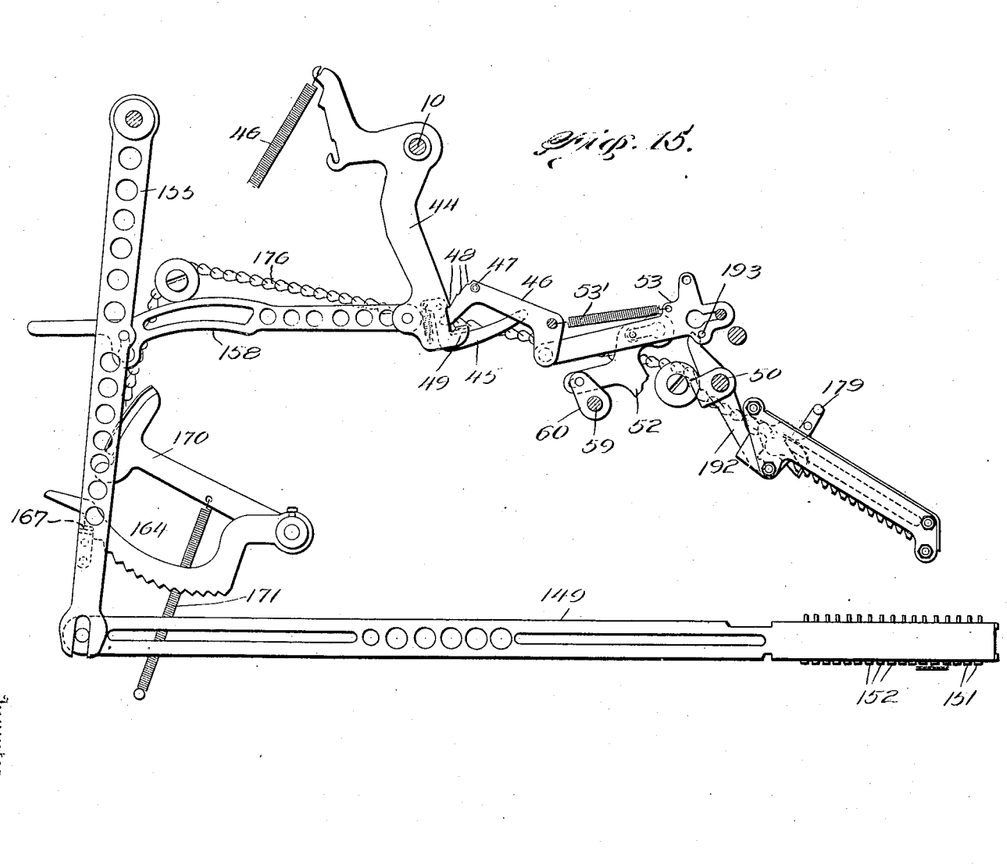
Figure 15 is a detail view in side elevation, illustrating a control mechanism for an auxiliary recording unit included in my invention.

To render the special character and date printing unit operative for date printing purposes there is provided means for shifting the segmental stop lever 46 out of normal obstructing position relative to the stop 49. This means is controlled by the setting key 179 and includes a lever 192, one end of which engages a pin 193 on the sliding link 53. The other end of the lever 192 (see Figures 15 and 19) is, in the starting position of the setting key, engaged by a cam 194 on said key whereby said sliding link 53 and segmental stop lever 46 are held in normal position against the urge of the spring 53'. When the setting key 179 is slid from its starting position the lever 192 is released whereupon the spring 53' moves the sliding link 53 to set the segmental stop lever 46 into an unobstructing position as shown in Figure 15. The type carrier 149 may then be moved by its spring 46 until stopped by its stepped segment 164.

An identification recording unit is also associated with the main recording mechanism as follows. Mounted at the side of the type carriers 88 opposite the type carriers 147, 148 and 149 of the combined special character and date recording unit is a type carrier 195 (Figs. 1, 8 and 11) similar to those previously described but carrying a series of abbreviating type 196 for identifying items, for instance balance, net, or credit items. The type carrier 195 is mounted and operated to move the type 196 to and from recording position precisely as described with reference to the other type carriers through the medium of a type carrier lever 197, link 198, arm 199 and spring 200.

Figure 16:
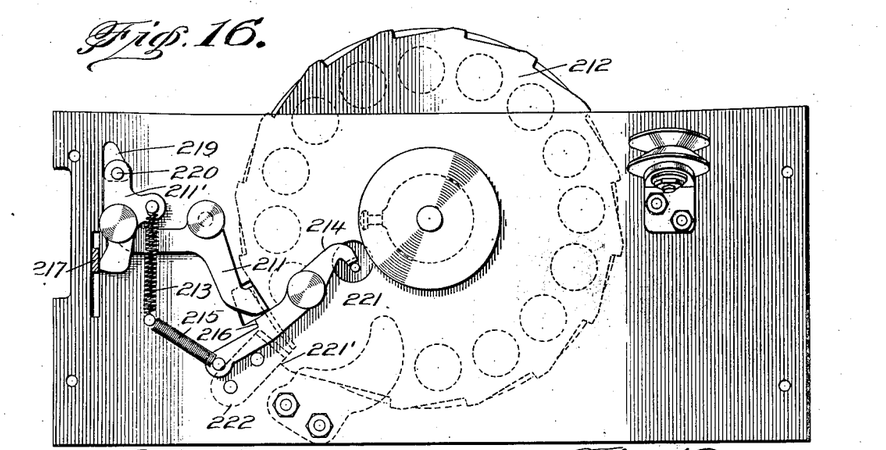
Figure 16 is a view in rear elevation of a control mechanism for another auxiliary recording unit of my invention.
Figure 17:
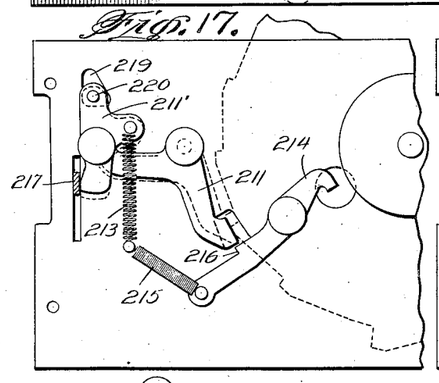
Figure 17 is a front elevation thereof.
Figure 18:
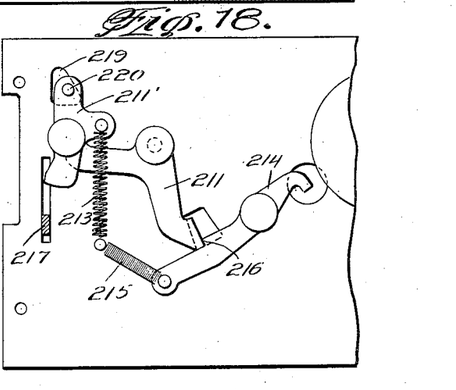
Figure 18 is a view similar to Fig. 17 illustrating the parts in another position.

A hammer 201 corresponding in character and position to the hammers 125 cooperates with the type 196. Selection of the type in this instance is controlled, independently of the keys of the calculating mechanism, by a dial wheel 202 (Figs. 1, 2 and 16–18) suitably mounted upon a plate 203 secured to the front of the casing 1. The dial wheel 202 is adapted to wind up a pull chain 204. The chain 204 is connected to a setting lever 205 of another pivoted stepped segment 206 held in a normal position by a spring 207 and cooperating with a stop lug 208 on said type carrier lever 197. The dial wheel 202 has finger holes 209, designated in correspondence with the type 196, and by means of which it is rotated, up to a stop 210 intercepting a finger of the operator. The dial wheel 202 and stepped segment 206 are held in set position during the downstroke of the operating crank 15 which is to say during the recording operation and are then automatically returned as follows. A pivoted holding dog 211 engages a ratchet wheel 212 on the dial wheel (see Figures 16 to 18). The holding dog 211 has pivoted thereon a floating trip dog 211'. A suitably connected spring 213 urges said trip dog about its pivot in one direction and the holding dog 211 into engagement with the ratchet wheel 212. The holding dog 211 during its normal play between teeth of the ratchet wheel 212 bears at one end against a locking dog 214 which is urged by a spring 215 in the direction of said holding dog. The locking dog 214 has a shoulder, as at 216, positioned to engage said end of the holding dog and lock said dog in a disengaging position when it is moved rearwardly beyond its normal play.

The holding dog 211 is moved to disengaging position by a pivoted rocking lever 217 operatively connected as at 218 to the connection 18 (see Figures 3 and 5) to move in unison with the operating crank and normally bearing against the trip dog 211' to prevent pivotal movement thereof. When the operating crank 15 is moved downwardly corresponding movement of the rocking lever 217 releases the trip dog 211' which thereupon snaps over said lever. During the return stroke of said crank and lever the latter picks up the trip dog 211' and thus moves the holding dog 211 to disengaging position. At the proper time the locking dog 214 is operated by its spring 215 into locking position. A cam slot and pin connection 219 and 220, respectively, between the trip dog 211' and the plate 203 cams said trip dog from over the rocking lever 217 before the latter begins its down stroke and retains said dog in this position until the locking dog 214 is released. As soon as the holding dog 211 moves to disengaging position the spring 207 (Fig. 2) returns the stepped segment 206 and dial wheel 202 to starting position. As the latter nears starting position a pin 221 (Fig. 16) thereon engages and moves the locking dog 214 to a releasing position. The holding dog 211 and trip dog 211' are then returned by the spring 213. The ratchet wheel 212 is provided with a stop tooth 221' engaging a stop 222 to hold the dial wheel 202 in its home position against the action of the spring 207.

The pin 221 may, as will be obvious, be used to manually release the holding dog, and thus correct a wrong selection before it is recorded.

The foregoing constitutes a detailed description of a preferred embodiment of my invention, but I reserve the right to effect such modifications or variations thereof as may come fairly within the scope of the appended claims.

I claim:

1. In a recording mechanism, an operating shaft, type carriers movable to and from recording position, type hammers adapted to be latched in a retracted position, releasable type hammer latches, and latch releasing means on the operating shaft and directly engaging said latches.

2. In recording mechanism, an operating shaft, horizontal type carriers movable to and from recording position during movement of said shaft, type hammers adapted to be latched in retracted position, releasable type hammer latches, a hammer resetting bail, bail latches, and means carried by said shaft for releasing all said latches.

3. In recording mechanism, an operating shaft, horizontal type carriers movable to recording position during movement of said shaft in one direction, type hammers adapted to be latched in retracted position, releasable type hammer latches, a hammer resetting bail adapted to be latched in resetting position, releasable bail latches, and means carried by said shaft for releasing all said latches during movement of said shaft in one direction.

4. In recording mechanism, an operating shaft, horizontal type carriers movable to and from recording position during movement of said shaft, type hammers adapted to be reset to a retracted position, a hammer resetting bail, a releasable bail latch, and means carried by said shaft for moving the latch to releasing position, said means engaging said bail and holding it stationary until said latch is fully released.

5. In recording mechanism, an operating shaft, horizontal type carriers movable to and from recording position during movement of said shaft, type hammers, a hammer resetting bail, a releasable bail latch for holding the bail in resetting position, and means for resetting the bail and holding the latch released during said resetting operation, and including cams on said bail and latch, respectively, and a member carried by said shaft for engaging said cams.

6. In recording mechanism including keys, and operating mechanism, a horizontal type carrier movable by said operating mechanism in opposite directions, respectively, control mechanism operable independently of the keys for controlling the extent of movement of said type carrier in one direction and automatically returned to starting position under control of said operating mechanism.

7. In recording mechanism including keys, and operating mechanism, a horizontal type carrier movable by said operating mechanism in opposite directions, respectively, control mechanism operable independently of the keys to control the extent of movement of said type carrier in one direction and automatically restored to starting position under control of said operating mechanism after the type carrier has been moved in the opposite direction.

8. In recording mechanism including operating mechanism, a horizontal type carrier movable by said operating mechanism in opposite directions, respectively, mechanism for controlling the extent of movement of said type carrier in one direction automatically returned to starting position, and including a rotatable setting member, and means under the control of the operating mechanism and preventing return of said member until the type carrier has been moved in the opposite direction.

9. In recording mechanism including operating mechanism, a horizontal type carrier movable by said operating mechanism, settable mechanism controlling the extent of movement of said type carrier and automatically returned to starting position, releasable devices under control of the operating mechanism for normally holding the settable mechanism in a selected position, and means for latching the releasable devices in released position, said means being operated by return movement of said settable mechanism to unlatch the releasable devices.

10. In recording mechanism including operating mechanism, a horizontal type carrier movable by said operating mechanism, settable mechanism controlling the extent of movement of said type carrier and including a dial wheel, means for normally holding said mechanism in a selected position, including a ratchet wheel and a holding dog, and means for releasing said dog by operation of said operating mechanism.

11. In a recording mechanism including operating mechanism, a horizontal type carrier movable by said operating mechanisms, settable mechanism controlling the extent of movement of said type carrier, and including a combined dial and ratchet wheel, a holding dog for the ratchet wheel released by said operating mechanism, and a latching dog for the holding dog released by said ratchet wheel.

12. In a calculating mechanism, the combination with operating mechanism, of recording mechanism including a type carrier movable past the printing point by the operating mechanism, means for controlling the extent of movement of the type carrier, and including a rotatable setting member, and a releasable detent mechanism for the setting member released by said operating mechanism.

13. In a machine of the class described, the combination with calculating mechanism including operating mechanism and a series of control keys, of a recording member operative by said operating mechanism to record different kinds of symbols, and normally under control of said series of special control keys as regards the recording of one kind of symbols, and manipulative means to control said member for the recording of other symbols independently of said control keys.

14. In a machine of the class described, the combination with calculating mechanism, including operating mechanism and a series of special control keys, of a recording member operative by said operating mechanism to record different kinds of symbols, and under control of said special control keys as regards the recording of one kind of symbols, manipulative means to control said member for the recording of other symbols, and means operative by said manipulative means for rendering the special control keys ineffective to control said member.

15. In a machine of the class described, the combination with calculating mechanism, including operating mechanism, and a series of special control keys, of recording mechanism operative by said operating mechanism to record, and including a type carrier having two sets of differently characterized type thereon, and normally under control of said special control keys as regards recording with one set of type, and means including a key for controlling said type carrier to record with the other set of type independently of said special control keys.

16. In a machine of the class described, the combination with calculating mechanism including operating mechanism, and a series of special control keys, of recording mechanism operative by said operating mechanism to record, and including a type carrier having two sets of differently characterized type thereon, and normally under control of said special control keys as regards recording with one set of type, means including a key for controlling said type carrier to record with the other set of type independently of said special control keys, and devices effective upon movement of said key from normal position and rendering said control keys ineffective to control said type carrier.

17. In recording mechanism, an operating shaft, type carriers movable to recording position, type hammers, releasable type hammer latches adapted to be set for movement to releasing position, cooperating means on said carriers and latches, respectively, for setting the latter by said movement of the former, and means for releasing set latches by operations of said shaft.

18. In a recording mechanism, an operating shaft, type carriers movable to recording position, releasable type hammer latches adapted to be set for movement to releasing position, cooperating means on said carriers and latches, respectively for setting the latter by said movement of the former, and means for moving set latches to releasing position and including, co-engaging devices on said shaft and latches, respectively, coupling and uncoupling said latches and shaft.

19. In a recording mechanism, an operating shaft, type carriers movable to recording position, releasable type hammer latches adapted to be set for movement to releasing position, means for setting said latches by said movement of the type carriers, and means for moving set latches to releasing position, and including a latch engaging bail on the operating shaft.

20. In recording mechanism, an operating shaft, type carriers movable to recording position, releasable type hammer latches adapted to be set for movement to releasing position, cooperating devices on said carriers and latches, respectively, for setting the latter by said movement of the former, and means for moving set latches to releasing position, and including a latch engaging bail on the operating shaft.

21. In recording mechanism, an operating shaft, type carriers movable to recording position, releasable type hammer latches adapted to be set for movement to releasing position, and having pivotal setting and sliding releasing movement, respectively, cooperating devices on said type carriers and latches, respectively, for setting the latter by movement of the former, and latch releasing means, including a bail on said shaft engaging set latches.

22. In recording mechanism, an operating shaft, type carriers movable to recording position, type hammers adapted to be reset to a retracted position, releasable type hammer latches, a hammer resetting member, a releasable latch for said member, and means carried by said shaft for releasing all said latches.

23. In recording mechanism, type carriers movable to recording position, type hammers adapted to be reset to a retracted position, a hammer resetting member, a releasable latch for said member, releasable latches for said type hammers, and means for releasing all of said latches successively in the order named.

24. In recording mechanism, an operating shaft, type carriers movable to recording position, type hammers adapted to be reset to a retracted position, a hammer resetting member, a releasable latch for retaining said member in hammer resetting position, releasable latches for retaining the type hammers in retracted position, and means operative by said shaft to release all said latches successively in the order named, said means retaining said member in hammer resetting position until the latch for said member is fully released.

25. In recording mechanism, a rock shaft, type carriers, type hammers adapted to be reset to a retracted position, a member operative to reset said hammers, a releasable latch for retaining said member in hammer resetting position, releasable latches for retaining said hammers in retracted position, and means operative by movement of said shaft in one direction to release said latches, and operating said member to reset said hammers upon movement of said shaft in the opposite direction, said means including a bail on said shaft engaging said latch and member.

26. In recording mechanism, a rock shaft, type carriers, type hammers adapted to be reset to a retracted position, a member operative to reset said hammers, a releasable latch for retaining said member in retracted position, releasable type hammer latches, and means operative by movement of said shaft in one direction to release said first and second latches in succession, and operating said member to reset said hammers upon movement of said shaft in the opposite direction, said means including a bail on said shaft engaging said latches and member.

27. In a machine of the class described, the combination with a reciprocatory type carrier, and operating mechanism for reciprocating said type carrier, of means for limiting movement of said carrier in one direction, in different degree, and including a rotatable member adapted for manual setting to different positions, and means for retaining said member in set position during movement of said carrier in said one direction, and operative by said operating mechanism to release said member upon movement of said carrier in the opposite direction.

28. In a machine of the class described, the combination with operating mechanism, of a recording member operative by said mechanism to record different kinds of symbols, means including a series of keys for controlling said member as regards the recording of one kind of symbols, and manipulative means to control said member for the recording of other symbols, one of said means disabling the other.

29. In a calculating mechanism, the combination with operating mechanism; of recording mechanism, including a type carrier movable past the printing point by said operating mechanism; two sets of type on said type carrier; and two control mechanisms for determining the extent of movement of the type carrier, respectively; said control mechanisms including individual control keys, and one disabling the other.

HARRY A. FOOTHORAP.